(12) United States Patent
Peschel

(10) Patent No.: US 7,619,178 B2
(45) Date of Patent: Nov. 17, 2009

(54) DIRECTLY CONNECTED MAGNETRON POWERED SELF STARTING PLASMA PLUME IGNITER

(76) Inventor: William P. Peschel, 2421 Glyndon Ave., Venice, CA (US) 90291

( * ) Notice: Subject to any disclaimer, the term of this patent is extended or adjusted under 35 U.S.C. 154(b) by 606 days.

(21) Appl. No.: 11/348,170

(22) Filed: Feb. 6, 2006

(65) Prior Publication Data
US 2007/0182336 A1   Aug. 9, 2007

(51) Int. Cl.
*B23K 10/00* (2006.01)
(52) U.S. Cl. .......................... 219/121.37; 219/121.43; 219/121.48; 219/121.52; 315/111.21
(58) Field of Classification Search ............ 219/121.54, 219/121.57, 121.48, 121.51, 121.55, 121.43, 219/121.52; 315/111.21, 111.51; 60/39.821–39.826
See application file for complete search history.

(56) References Cited

U.S. PATENT DOCUMENTS

| 2,587,331 | A |  | 2/1952 | Jordan .......................... 219/14 |
| 2,942,420 | A |  | 6/1960 | Clark ....................... 60/111.21 |
| 4,337,408 | A |  | 6/1982 | Sone et al. ................... 313/130 |
| 4,473,736 | A |  | 9/1984 | Bloyet et al. .......... 219/121 PM |
| 4,609,808 | A |  | 9/1986 | Bloyet et al. .......... 219/121 PR |
| 4,611,108 | A |  | 9/1986 | Leprince et al. ....... 219/121 PR |
| 4,645,973 | A |  | 2/1987 | Saliner et al. .................. 315/39 |
| 4,924,061 | A |  | 5/1990 | Labat et al. ............. 219/121.52 |
| 5,086,255 | A |  | 2/1992 | Okamoto et al. ....... 315/111.21 |
| 5,257,500 | A |  | 11/1993 | Venkataramani et al. . 60/39.821 |
| 5,414,235 | A |  | 5/1995 | Lucas et al. ............. 219/121.43 |
| 5,565,118 | A |  | 10/1996 | Asquith et al. ......... 219/121.57 |
| 2007/0044449 | A1 | * | 3/2007 | O'Brien et al. .......... 60/39.826 |

OTHER PUBLICATIONS

"Cavity Magnetron" Wikipedia article (Internet) Printed Feb. 14, 2009.

* cited by examiner

*Primary Examiner*—Mark H Paschall
(74) *Attorney, Agent, or Firm*—Saul Epstein

(57) ABSTRACT

An igniter for use in aircraft gas turbine and rocket engines that derives its energy from a directly connected magnetron. The igniter is intended to be mounted exterior of the engine, and to protrude into the engine's combustion chamber. The magnetron energy is conductively connected to one end of a coaxial transmission line. The other end of the transmission line is at a region of high potential, and there is a small gap between the inner and outer transmission line conductors in that region. A gas comprised of either an oxidizer or fuel is flowed past the gap, and into the combustion chamber of the engine. The high potential causes a plasma to be formed in the gas, which plumes into the combustion chamber and ignites the propellants flowing therein. In another embodiment disclosed, instead of the plasma flowing directly into the combustion chamber after creation, it flows for a short distance in a pre-burner section of the igniter where fuel is added in the case of an oxidizer plasma, or oxidizer is added in the case of a fuel plasma. In either case, a flaming mixture is created which is then injected into the combustion chamber to ignite the propellants. Both straight through embodiments and embodiments having a right angle bend in the transmission line are disclosed.

20 Claims, 5 Drawing Sheets

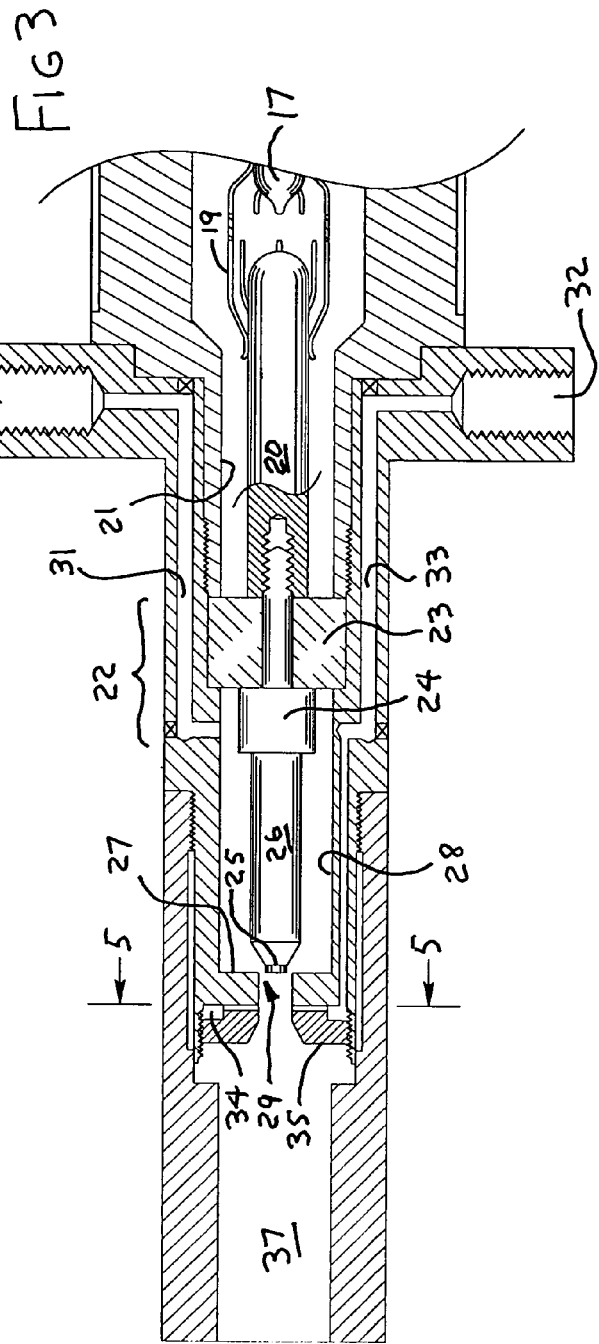
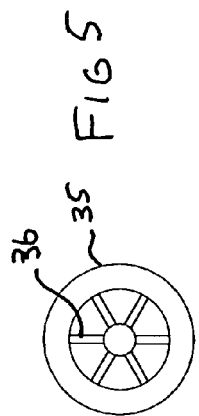
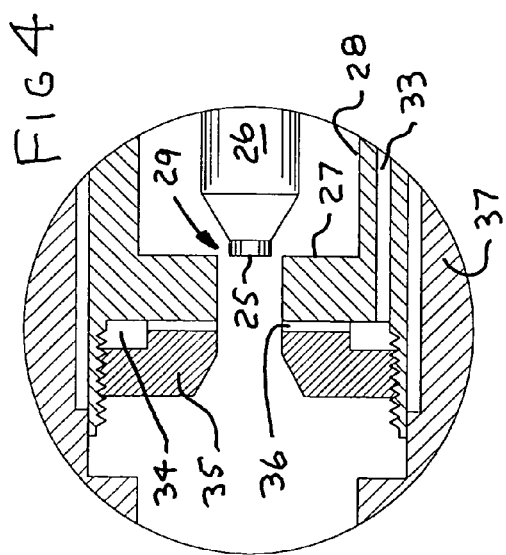

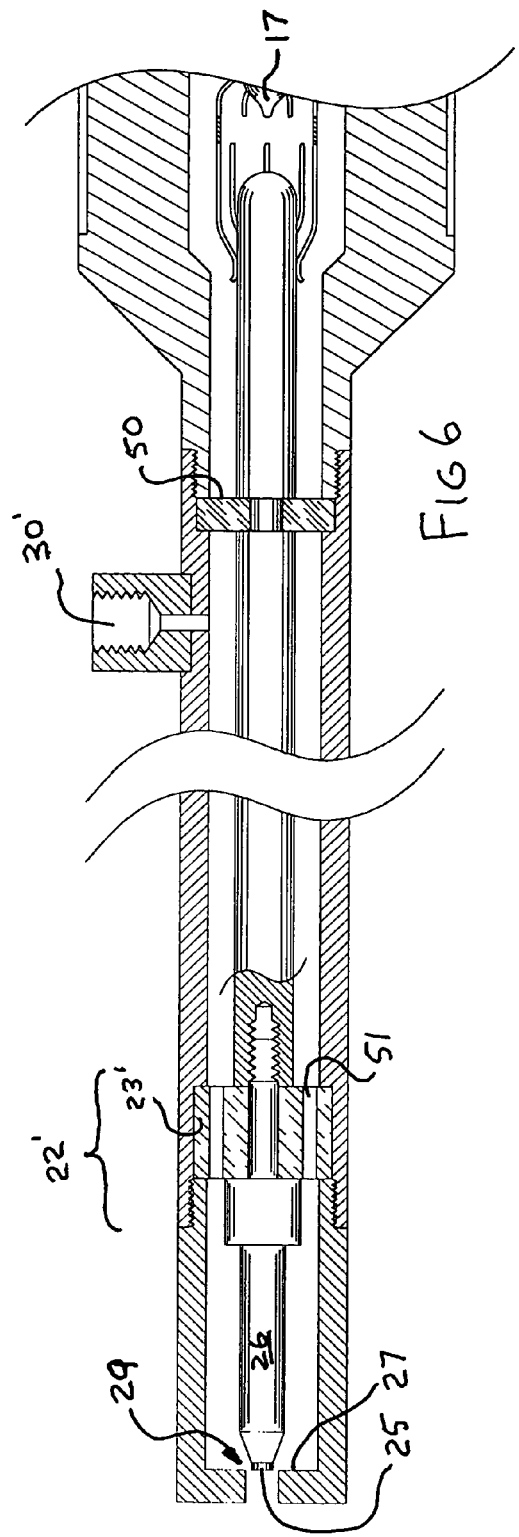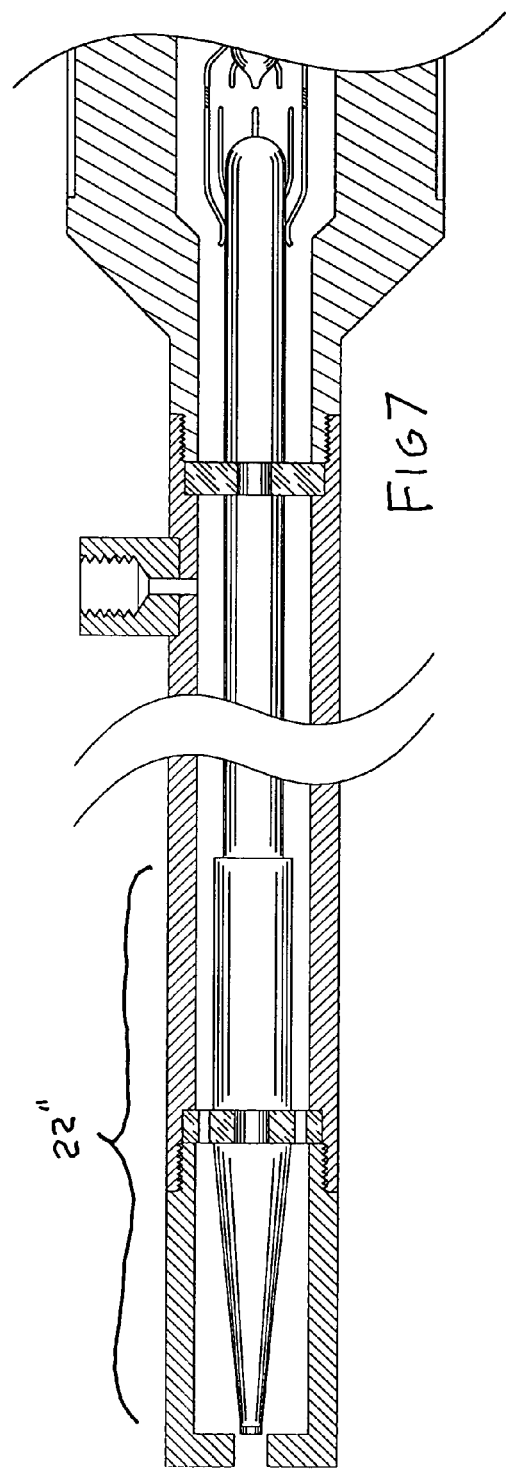

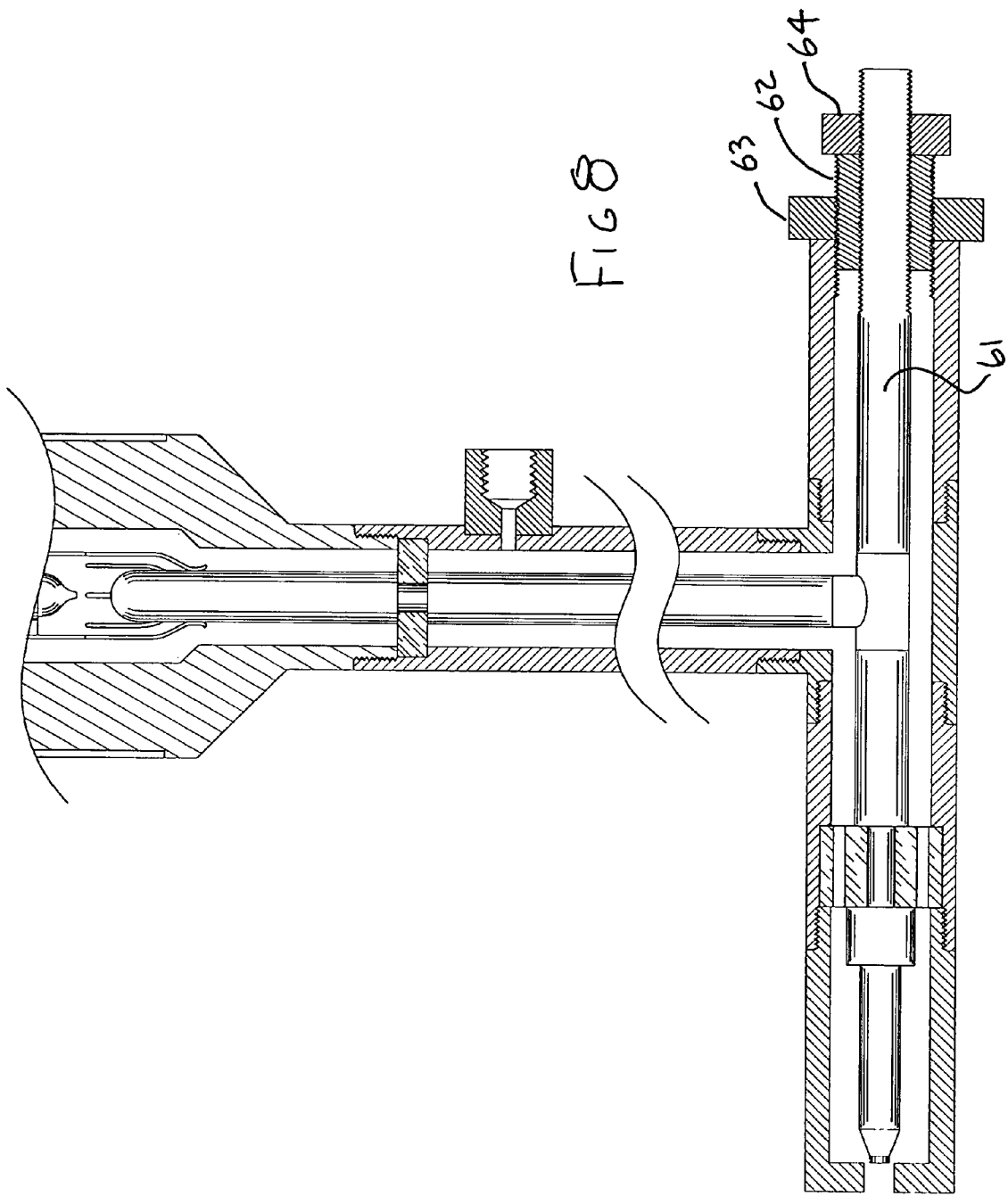

DIRECTLY CONNECTED MAGNETRON POWERED SELF STARTING PLASMA PLUME IGNITER

BACKGROUND OF THE INVENTION

Turbojet, turbofan, and rocket engines of current design are generally started using spark discharge igniters that protrude into the engine's combustion chamber, or into a precombustion chamber and ignition flame tube, as in the Space Shuttle main rocket engine. A commonly used igniter type employs a high voltage source (several tens of kilovolts) which is repeatedly discharged across a gap in a manner similar to ordinary automobile spark plugs. One particular design of this type is called a cavity type plasma jet igniter. The spark plugs used with this type system have a small cavity integrated into the region where the electrodes are located. When fired, the arc discharge ejects or puffs-out a heated volume of gas through an orifice in the cavity into the fuel/air mixture, the heated volume including a plasma filament.

Variations of this type of plug, in combination with surface discharge spark initiation features, have become widely used as combustor igniters in turbojet engines, and have seen some application in internal combustion piston engines. It must be recognized, however, that these igniters do not and cannot sustain combustion, they only ignite the flowing fuel-air mixture for the duration of each plasma pulse. As a consequence, other means must be provided to maintain a continuous flame within the engine during operation (generally called "stabilization" of the flame).

A key advantage of cavity type plasma jet spark devices over ordinary sparkplugs is that they launch the short-duration, spark-type, plasma filament away from the combustor walls which could otherwise cool or quench the ignition kernel. By launching it into the combustor, the plasma more readily reaches a region containing a combustible mixture. The fuel/air mixture in a turbojet or rocket combustor region near the walls could be in a less than optimum condition for ignition due to cold surroundings and boundary layer mixing limitations.

On the other hand, cavity type plasma jet spark devices have significant disadvantages in aircraft jet engine applications. In order to deliver the appreciable level of energy necessary to induce ignition, they must operate intermittently. Normally, only about 1 to 2 joules of the 12 to 14 joules developed in a high energy aircraft system reaches the combustion kernel region. Commonly available systems are limited to about 100 to 300 discharges per minute if minimally adequate energy is to be transferred. This is a severe disadvantage during a landing approach or under bad weather flight conditions, when assurance of engine ignition is critical. It is also a disadvantage when attempting to relight a flamed out engine at high altitudes.

Another type of igniter system employs a lower voltage source, perhaps 2 to 5 kilovolts, with a storage means capable of storing 10 to 12 joules of energy. This type of igniter employs a sealed barrier gap switch to hold-off the discharge until a relatively large amount of energy has been built up in the system. The barrier switch fires at a predetermined voltage allowing a discharge across the air gap to proceed. The plugs in this system generally consist of inner and outer concentric electrodes spaced by a ceramic high temperature insulator. The insulator may be coated with a semiconductor material which facilitates ionization in the discharge gap, thus permitting the spark discharge to initiate at the relatively low 2-5 kilovolt voltage. The discharge starts along the surface and builds to a typical ignition spark.

Whichever spark discharge design is used, plug technology is extremely sensitive to excess quantities of fuel (rich mixtures) which can be developed in emergency or inclement weather relight situations. Under these conditions, the discharge can be very substantially reduced and its plasma jet ejection capability almost eliminated.

There have been a number of plasma plume devices built in the past, mostly for use as torches. These devices have not generally been thought suitable for use as engine igniters because they have not been self-starting, requiring some sort of triggering spark to initiate the plasma.

A prior patent, U.S. Pat. No. 5,565,118, of which the present inventor was a co-inventor, discloses a plasma plume igniter driven by a magnetron as is the present invention. One essential difference between the '118 patent and the present invention is that the magnetron in the '118 patent is coupled to its load through a waveguide, as is common with magnetron driven equipment. In the present invention, no waveguide is used; the magnetron is directly connected to a coax transmission line, at the end of which the plasma plume is generated. The discussion in the '118 patent relating to the coax transmission line and the plasma plume generation, as well as other portions of the disclosure, is relevant to the present invention; hence the disclosures of the '118 patent are incorporated herein by reference.

SUMMARY OF THE INVENTION

The present invention is an igniter for igniting and maintaining flame in an aircraft gas turbine or a rocket engine. It involves generating a plasma of either oxidizer or fuel using microwave electromagnetic energy, and injecting the plasma as a plume into the combustion chamber of the engine. The microwave electromagnetic energy used to create and maintain the plasma plume is provided by a magnetron that is directly connected to a coaxial transmission line, rather than being coupled to it through a waveguide and associated antennas, as is done in the prior art. The direct connection of the magnetron to the coax transmission line avoids the necessity of providing a waveguide coupling, and hence saves space and weight, and improves electrical efficiency.

The coax line carries the electromagnetic energy to a region where the energy field is concentrated into a small area at a gap between corners at the ends of the inner and outer transmission line conductors. The transmission line preferably has an electrical length so as to maximize the open circuit voltage at the gap before breakdown, and allow the magnetron to start at the correct frequency without "moding". Because of the high frequency and high energy density existing across the gap, the gas in the gap ionizes, creating a plasma without the necessity of providing additional starting energy. Gas flow past the gap and out of the end of the coaxial transmission line causes the plasma to fan out into a plume.

The fundamental design allows application to systems requiring multiple ignitions at both sea level and at near vacuum conditions. Consequently the invented igniter can be employed in a fly-back rocket booster configuration designed for multiple launch restarts, as well as in applications involving space relights.

The invented magnetron driven microwave plasma igniter may be arranged in either of two configurations:

The first involves generating a high temperature fuel or oxidizer plasma using microwave energy, and then directing it through a pre-burner section of the igniter where fuel is added to an oxidizer plasma or oxidizer is added to a fuel plasma. The mixture spontaneously ignites and creates an extremely penetrating flame, which is injected into the engine combustion chamber to cause propellant ignition.

The second configuration is similar to the first, except that no pre-burner section is used. The fuel or oxidizer plasma is injected directly into the combustion chamber as a plasma plume without being mixed with another gas or flowing through a pre-burner section.

The first igniter configuration, which includes an integral pre-burner section in addition to a plasma generator, is particularly suitable for use with (gassified) LOX as the oxidizer, and hydrogen or hydrocarbon fuel systems (including methane). By creating a flaming mixture of fuel and oxidizer, this type of igniter injects a greater amount of ignition energy into the combustion chamber to insure ignition of the propellants therein.

With a pre-burner section in place, fuel (or oxidizer in the case of a fuel plasma) is fed into the plasma just downstream of the gap, and the plasma/fuel mixture is contained in the pre-burner section for a further distance before the mixture is released into the combustion chamber. The fuel ignites in the pre-burner section, and the flaming mixture is injected into the engine combustion chamber.

Either a fuel or an oxidizer plasma may be used in this configuration, but an oxygen plasma is preferred. An oxygen plasma is extremely reactive; it combines with fuel instantaneously and continuously in the pre-burner region to develop an extremely robust pilot flame that projects well into the combustion chamber. The pre-burner, being integrated with the igniter, promotes complete combustion in the pilot flame, and cannot be blown out because the continuously generated oxygen plasma functions as a stabilizing flameholder.

As used in an aircraft gas turbine engine (which includes turbojet and turbofan engines) the present invention, employing the second configuration, can provide a high energy plasma plume which extends well into the combustor (or augmentor) section of the engine to ignite the flowing fuel/air mixture existing in the engine. The igniter can be operated either in continuous or in intermittent modes, as desired, to achieve the desired results. Using simply air as the oxidizer feed gas, a plasma plume can be generated that can maintain combustion in the combustor or augmentor without the need of flameholders.

In the context of a rocket engine, the present invention employing the second configuration, may for example, utilize gaseous hydrogen, gaseous methane, or other gaseous hydrocarbon as the plasma gas. In an arrangement using an oxygen lead cycle, the main combustion chamber may be filled with oxygen (at low pressure) before the fuel is injected. When the engine is to be started, fuel is injected and the microwave generated plasma igniter is turned on. The ensuing plasma (in this case a fuel plasma, e.g., hydrogen or methane) exiting the igniter reacts with the surrounding oxygen, thereby causing a local flame that ignites the entire combustion chamber.

It will be appreciated that the present invention is intended to operate in a relatively harsh environment, where it will be subjected to high temperatures. Accordingly, materials should be used that are suitable for use at the anticipated temperatures, and attention should be paid to differential expansion effects. The drawings accompanying this specification are drawn to illustrate the principles of operation, and for clarity, gaskets, etc. that might be required to prevent leakage are not shown. Additionally, since certain elements carry high frequency currents that concentrate near the surface of the conductors, for increased efficiency, silver plating or the like should preferably be considered. Many of the parts shown are assembled using screw threads. Those skilled in the art will understand that other assembly methods, including welding, brazing, high temperature soldering, screws, rivets, etc. would be suitable alternative methods of assembly.

BRIEF DESCRIPTION OF THE DRAWINGS

FIG. 3 is a cross sectional side view of the first embodiment of the invention, showing the coaxial transmission line and plume forming portion, but only small portion of the magnetron.

FIG. 4 is a fragmentary enlarged sectional view of the region around the gap formed between conductor end 25 and end cap 27 of the embodiment of the invention shown in FIG. 3.

FIG. 5 is a view of the fuel distribution guide as viewed in the direction indicated by 5-5 of FIG. 3.

FIG. 6 is a partially sectioned side view of a second embodiment of the invention, showing a portion only of the magnetron.

FIG. 7 is a partially sectioned side view of a third embodiment of the invention, similar to the embodiment of FIG. 6, but including a different type of matching transformer.

FIG. 8 is a partially sectioned side view of still another embodiment of the invention wherein the body includes a right angle bend.

DETAILED DESCRIPTION OF THE INVENTION

Figure 1:
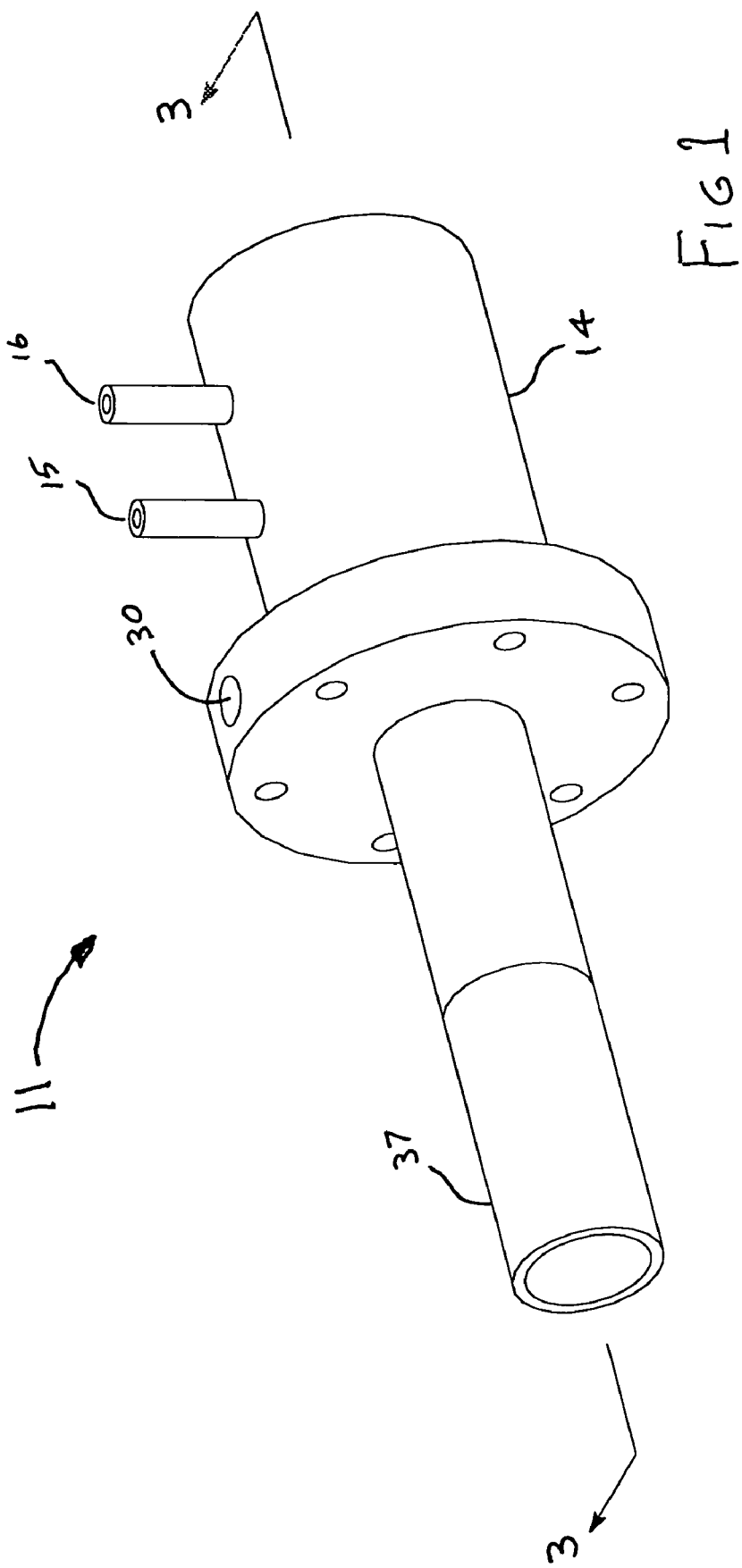
FIG. 1 is a trimetric view of a first embodiment of the invention.

FIG. 1 depicts a trimetric view of a first embodiment 11 of the invention. The embodiment shown is a "straight through" configuration, as opposed to the right angle version depicted in FIG. 8.

Figure 2:
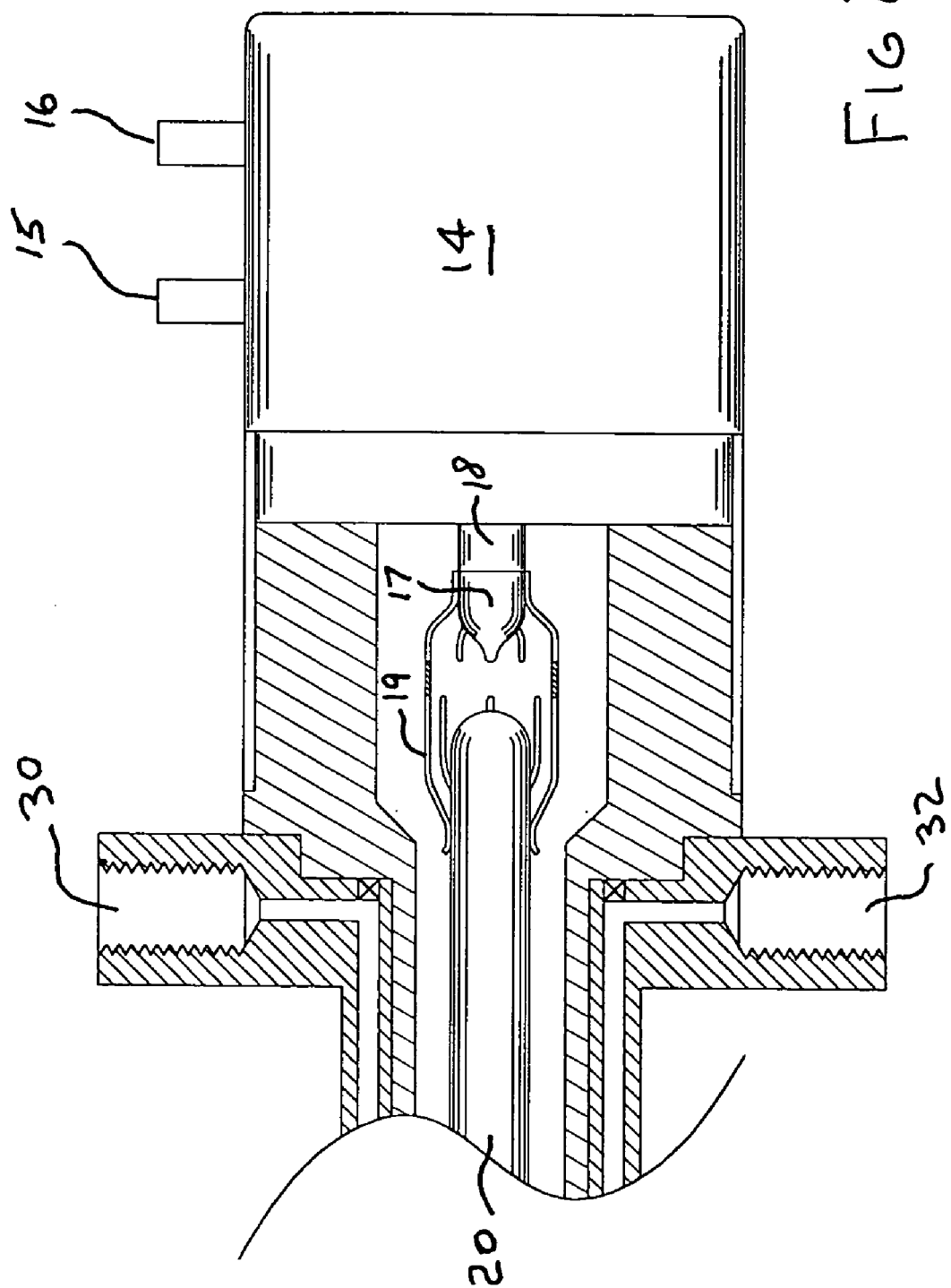
FIG. 2 is a partially sectioned side view of the power input end of the coaxial transmission line and the magnetron of the first embodiment of the invention.

FIG. 2 shows a partially sectioned side view of the magnetron end of the igniter shown in FIG. 1. Magnetrons having a power output rating in the range between 600 watts and 2 kilowatts are preferred, but powers outside this range may be used, if desired. Rated power in the preferred range provides an adequately robust plasma for most uses, without dissipating excessive heat. More preferred yet is a magnetron having a power output rating of 1.3 kilowatts. A frequency of about 2.45 GHz, which is a commonly used frequency for magnetrons, has been found to function well.

Substantial heat is generated by magnetrons, and external cooling is generally required. The preferred form of cooling is by liquid flowing through cooling coils within the magnetron, but other forms of cooling may be used, if desired. To depict the preferred cooling method, cooling media connections inlet 15 and outlet 16 are shown schematically on the magnetron 14 in FIG. 2. One convenient source of cooling liquid could be the fuel used in the engine, or alternatively, water, if available, could be used. If a liquid fuel or oxidizer, such as LOX is used, heat from the magnetron could be used for vaporization.

Magnetrons normally radiate their output into a waveguide; however in the present invention the magnetron is directly connected to the igniter. In the illustrated embodiments, the output of the magnetron appearing at the pinch-off tube 17 is conductively connected to the center conductor 20 of a coaxial transmission line through spring clip 19. The region 18 adjacent to pinch-off tube 17 is the ceramic window through which the magnetron output is normally radiated. Referring to FIG. 3, conductor 20 is the center conductor of the first section of the coaxial transmission line that conducts energy from the magnetron to a gap 29 existing between the corners of the free end 25 of the center conductor and the end cap 27 of the outer conductor. The complete transmission line consists of inner conductor 20 and outer conductor 21, impedance matching transformer 22, and inner conductor 26 and outer conductor 28 (ending in conductor end 25 and end cap 27). As can be seen most clearly in FIG. 4, the gap 29 exists between the outer corner of end 25 and the inner corner of end cap 27.

The electrical length of the transmission line from the magnetron to the plasma load (which is located a small distance beyond the gap 29) is preferably approximately some multiple of one half wavelength long. The potential existing across the gap before the plasma is formed is consequently high. Various factors cause the electrical length of the transmission line to not equal its physical length, hence the optimum physical length of the transmission line is preferably determined by experiment.

The inner surface of end cap 27 is preferably positioned about even with the conductor end 25, as can be seen in the figures, but the exact placement for optimum performance may vary somewhat from that position. The plasma is developed at the gap between the corner of conductor end 25 and the corner of end cap 27 as a result of the high voltage present at that point before breakdown.

Before the plasma is formed, an open circuit (i.e., a high impedance) appears between the end 25 of the inner conductor and end cap 27, which permits a high voltage to be developed. The impedance matching transformer 22 preferably provides a compromise match to this high impedance open circuit thereby minimizing microwave power being reflected back to the magnetron. The operating envelope of a typical magnetron (as shown by its Rieke diagram) illustrates acceptable performance up to a VSWR as high as about 5, where stable, non-moding operation will occur. Careful design of the impedance matching transformer 22 preferably limits the amount of microwave power reflected from the open circuit to a VSWR <5, and the magnetron starts and operates without moding. After breakdown, the plasma represents a load whose exact location and impedance depends on the pressure, the type of plasma gas, gas velocity, microwave power, and other factors, but experiment has shown that the impedance is generally about 100 ohms or higher and the effective location is somewhat downstream from end cap 27. The impedance matching transformer 22 now provides a compromise match to the plasma load and the magnetron continues operation without moding. In order to provide efficient transfer of power from the magnetron to the gap, the various sections of the transmission line should have characteristic impedances and shapes to avoid excessive reflection of power returning to the magnetron as is well known to persons skilled in the art. As an example, an igniter could be powered by a 1.3 Kw output magnetron, which could operate normally at about half that power, and have reserve to operate at full power for special conditions (e.g. high altitude re-light). The input section of the coaxial transmission line (inner conductor 20 and outer conductor 21) could have a characteristic impedance of about 41 ohms (assuming an inner conductor OD of 0.250" and an outer conductor ID of 0.500"). Accordingly, it is desirable to include one or more impedance matching sections between the input section of the transmission line and the gap so as to provide an approximate match to both the open circuit (thereby allowing the magnetron to start without moding) and the plasma load.

Two matching sections are shown in FIG. 3, the first being a quarter wave long section of transmission line comprised of inner conductor 26 and outer conductor 28, and the second being impedance matching transformer 22 comprised of ceramic spacer 23 and enlarged center conductor 24, this combination also being electrically about one quarter wavelength long. The physical length of matching transformer 23 in particular being substantially different from (and less than) the value calculated based on the wavelength in air. The preferred method of determining the optimum lengths is by experiment. Persons of skill in the art are aware of how to proportion the dimensions of the parts of the matching sections to achieve appropriate impedances, hence no discussion is included here.

Ceramic spacer 23, in addition to being a part of impedance matching transformer 22, also serves to pneumatically isolate the rear portion of the transmission line from the front, so that the magnetron does not encounter gas pressures due to the plasma forming gas, which can become relatively high.

In one embodiment of the invention (as illustrated in FIG. 3) an oxidizer gas, such as, for example, oxygen (possibly provided by evaporating LOX), or air, is introduced under pressure at fitting 30 and flows through passage 31 into the chamber surrounding conductor 26. Ceramic spacer 23 is a barrier to flow into the rear end of the chamber, so that the oxidizer flows out through the gap between conductor end 25 and end cap 27. With oxidizer flowing, and the magnetron creating a high frequency, high voltage difference between the corners of conductor end 25 and end cap 27, a plasma is created which flows outward in the form of a plume.

For some applications, the plasma plume generated as described above provides adequate energy to ignite the fuel/air mixture flowing into an aircraft jet engine for example. In such case, the portion of the igniter shown to the left of section marks 5-5 of FIG. 3 (the "pre-burner" section) would be omitted. Such an embodiment will be described below.

In the embodiment of FIG. 3, however, fuel, as for example, gaseous methane or an evaporated liquid hydrocarbon, is introduced at fitting 32. The fuel flows through passage 33 until it reaches annular manifold 34 that is formed between end cap 27 and fuel distribution guide 35. A plurality of radial slots 36 (six are shown in FIG. 5) guide the fuel to mix with the plasma exiting the central hole in end cap 27. Annular manifold 34 tends to cause the fuel to be injected into the plasma relatively evenly from all directions so as to optimize mixing.

As the fuel/oxidizer mixture flows through the pre-burner section 37, it combusts and forms a flame that projects out of the end of the igniter 11 into the engine combustion chamber. The flaming mixture of fuel and oxidizer injected into the combustion chamber assures ignition of the propellants existing in the chamber. It will be appreciated that while the pre-burner, as illustrated, is adapted to ignite the propellants in one engine, the flaming mixture emitted from pre-burner could be ducted to the combustion chambers of two or more engines so as to ignite the propellants in more than one engine simultaneously.

FIG. 6 depicts an embodiment of the invention wherein the plasma plume generated is discharged directly into the engine combustion chamber without first flowing through a pre-burner section. For ease of understanding, parts that are the same as those in the previously described embodiment are identified with the same numeral, and those which are similar, but not necessarily identical, are identified with a prime.

The plasma plume in this (as well as other) embodiments can be formed from either oxidizer or fuel. The plume can, for example, be formed from air or other oxidizing gas. As seen in FIG. 6, the feed gas is introduced at fitting 30'. Ceramic spacer 50 prevents the gas from flowing toward the magnetron and possibly subjecting it to high pressure. Instead, it flows toward the gap 29, passing through holes 51 in ceramic spacer 23'. As in the other embodiments, a magnetron (a portion of the pinch-off tube 17 of which can be seen in FIG. 6) is used to furnish power. A plasma is formed in the same manner as discussed above, which fans out into the combustion chamber as a plasma plume.

In some installations, air surrounding the engine is at a higher pressure than the gas inside the combustion chamber where the ignition takes place. In such case it may be convenient to, instead of furnishing a feed gas source through fitting 30', simply provide holes through the body of the igniter so that the surrounding air can flow in and become the feed gas.

FIG. 7 depicts an igniter similar to that shown in FIG. 6, but with a different type of impedance matching transformer 22". The design parameters for coaxial microwave impedance matching transformers is well known to those skilled in the art, and no further details need be given.

FIG. 8 depicts still another embodiment of the invention. This embodiment is generally similar to the embodiment of FIG. 6 except that there is a right angle bend in the body so that the igniter, as installed, does not extend axially as far away from the combustion chamber as would a straight embodiment, e.g., the embodiment of FIG. 6.

To provide support for the inner coaxial conductor a quarter wavelength shorted stub may be provided at the place that the inner conductor turns. As shown the stub extends to the right, but alternatively, for example it could extend downwards. The stub is preferably fitted with a tuning member to allow adjustment of its length. The inner conductor of the stub 61 is threaded at its end, as is the interior of the outer conductor, using the same pitch thread. A threaded bushing 62 (that fits both the inner and outer conductor threads) is threaded in until the tuning stub has the correct electrical length (about ¼ wavelength). Locknuts 63 and 64 are then tightened so as to prevent unwanted motion, and provide good electrical connections.

Several embodiments of a novel plasma plume igniter, powered by a directly connected magnetron, have been described. A number of exemplary fuels and oxidizing gases have been mentioned. The specific gases mentioned, however, are merely exemplary, and the invention is not limited thereto. Various modifications of the embodiments described will no doubt occur to those skilled in the art, which modifications, within the spirit of the appended claims, are intended to be covered thereby.

I claim:

1. A plasma plume igniter which comprises:
   a magnetron having an output terminal;
   a coaxial transmission line comprised of inner and outer conductors, said coaxial transmission line having an input end and an output end, said inner conductor at said input end being directly connected to said output terminal of said magnetron, said coaxial transmission line terminating at said output end in a gap between said inner and outer conductors; and
   means for introducing a plasma forming fluid into at least a portion of said coaxial transmission line at a pressure higher than that existing at said gap, there being a path allowing said plasma forming fluid to flow out of said coaxial transmission line through said gap.

2. A plasma plume igniter as recited in claim 1 wherein said gap is comprised of opposed corners on said inner and outer conductors.

3. In a method of operating a plasma plume igniter of the type described in claim 1 wherein said plasma forming fluid is an oxidizer.

4. In a method of operating a plasma plume igniter of the type described in claim 1 wherein said plasma forming fluid is an oxidizer and said oxidizer is chosen from the group consisting of air and oxygen.

5. In a method of operating a plasma plume igniter of the type described in claim 1 wherein said plasma forming fluid is a fuel.

6. In a method of operating a plasma plume igniter of the type described in claim 1 wherein said plasma forming fluid is a fuel and said fuel is chosen from the group consisting of hydrogen, hydrocarbon, and methane.

7. A plasma plume igniter as recited in claim 1 wherein said coaxial transmission line from said magnetron to said gap is electrically about some multiple of one-half wavelength long.

8. A plasma plume igniter as recited in claim 1 wherein said coaxial transmission line includes at least one impedance matching transformer between its input end and its output end.

9. A plasma plume igniter as recited in claim 1 and further including a pressure isolating seal which prevents said plasma forming fluid from exerting pressure on said magnetron.

10. A plasma plume igniter as recited in claim 9 wherein said pressure isolating seal is a ceramic spacer.

11. A plasma plume igniter as recited in claim 1 wherein said coaxial transmission line has an approximate right angle bend between its input end and its output end.

12. A plasma plume igniter as recited in claim 11 wherein the inner conductor of said coaxial transmission line at said bend is supported by a stub electrically about one quarter wavelength long and attached to said outer conductor.

13. A plasma plume igniter which comprises:
   a magnetron having an output terminal;
   a coaxial transmission line comprised of inner and outer conductors, said coaxial transmission line having an input end and an output end, said inner conductor at said input end being directly connected to said output terminal of said magnetron, said coaxial transmission line terminating at said output end in a gap between said inner and outer conductors;
   a pre-burner section comprised of an enclosed volume having an entry opening and an exit opening, said entry opening being attached to said output end of said coaxial transmission line;
   means for introducing a plasma forming fluid comprised of either a fuel or an oxidizer into at least a portion of said coaxial transmission line at a pressure higher than that existing at said gap, there being a path allowing said plasma forming fluid to flow out of said coaxial transmission line through said gap; and
   means for introducing the other of said fuel or en oxidizer to the output end of said coaxial transmission line downstream of said gap at the entry opening of said pre-burner section.

14. A plasma plume igniter as recited in claim 13 wherein said gap is comprised of opposed corners on said inner and outer conductors.

15. In a method of operating a plasma plume igniter of the type described in claim 13 wherein said oxidizer is chosen from the group consisting of air and oxygen.

16. In a method of operating a plasma plume igniter of the type described in claim 13 wherein said fuel is chosen from the group consisting of hydrogen, hydrocarbon, and methane.

17. A plasma plume igniter as recited in claim 13 wherein said coaxial transmission line from said magnetron to said gap is electrically about some multiple of one-half wavelength long.

18. A plasma plume igniter as recited in claim 13 wherein said coaxial transmission line includes at least one impedance matching transformer between its input end and its output end.

19. A plasma plume igniter as recited in claim 13 and further including a pressure isolating seal which prevents said plasma forming fluid from exerting pressure on said magnetron.

20. A plasma plume igniter as recited in claim 19 wherein said pressure isolating seal is a ceramic spacer.

* * * * *